United States Patent [19]

Herzl

[11] 4,134,297

[45] Jan. 16, 1979

[54] TWO-WIRE TRANSMISSION SYSTEM FOR VORTEX-TYPE FLOWMETERS

[75] Inventor: Peter J. Herzl, Morrisville, Pa.

[73] Assignee: Fischer & Porter Company, Warminster, Pa.

[21] Appl. No.: 846,245

[22] Filed: Oct. 27, 1977

Related U.S. Application Data

[62] Division of Ser. No. 768414, Feb. 14, 1977, Pat. No. 4,094,194.

[51] Int. Cl.$^2$ ............................................. G01F 1/32
[52] U.S. Cl. ............................................. 73/194 V.S.
[58] Field of Search ..................... 73/194 B, 194 VS; 331/65; 340/207 R

[56] References Cited

U.S. PATENT DOCUMENTS

| | | | |
|---|---|---|---|
| 2,697,594 | 12/1954 | Stanton | 331/65 X |
| 2,809,520 | 10/1957 | Richard, Jr. | 73/194 X |
| 3,122,707 | 2/1964 | Godbey | 340/184 X |
| 3,895,912 | 7/1975 | Naumann | 331/65 X |
| 3,948,098 | 4/1976 | Richardson et al. | 73/194 |

Primary Examiner—Herbert Goldstein
Attorney, Agent, or Firm—Michael Ebert

[57] ABSTRACT

A two-wire transmission system for a vortex-type flowmeter adapted to measure the flow rate of fluid passing through a conduit by generating fluidic oscillations giving rise to periodic pressure pulses whose repetition rate varies in accordance with flow rate. The system includes a pressure-responsive resonator element that is included in the tuned circuit of a high-frequency carrier oscillator whose frequency is determined by the normal resonance characteristics of the element in the absence of the pulses. The pulses applied to the element cause the oscillator to yield a carrier that is frequency-modulated in accordance with the repetition rate of the pulses to produce a frequency-modulated carrier that is demodulated to yield an output signal whose frequency is a function of flow rate. This signal is converted into an analog voltage that is conveyed over a two-wire transmission line to a remote station.

5 Claims, 3 Drawing Figures

TWO-WIRE TRANSMISSION SYSTEM FOR VORTEX-TYPE FLOWMETERS

RELATED APPLICATION:

This application is a division of my copending application Ser. No. 768,414, filed Feb. 14, 1977, now U.S. Pat. No. 4,094,194, entitled "Improved Sensing System for Vortex-Type Flowmeters."

BACKGROUND OF INVENTION

This invention relates generally to vortex-type flowmeters, and more particularly to a sensing system for such meters having a high degree of noise immunity.

A vortex-type flowmeter is adapted to measure the flow rate of a fluid passing through a conduit by generating fluidic pulses or oscillations whose repetition rate or frequency varies in accordance with flow rate. Two species of vortex-type meters are commercially available in the United States, one being the so-called Swirlmeter type and the other the bluff-body type. The present invention is not limited to these specific types and is applicable to all forms of hydrodynamic oscillatory metering devices in which fluidic variations are sensed to provide an indication.

In Swirlmeters, such as that described in U.S. Pat. No. Re. 26,410, a homogeneous fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube is a Venturi section which first constricts and then expands the flow passage to transform the swirling motion into precessional movement in the expanding region of the Venturi section to create a vortex.

In commercially available Swirlmeters, detection of the cyclic variations is effected by means of a sensor probe mounted in the body of the meter transversely with respect to the longitudinal axis of the meter in the area where the vortex precession is near the inner wall of the flow tube. At the tip of the sensor probe is a heated thermistor which serves to detect the frequency of precession.

In the Swirlmeter, the thermistor is caused to operate in its self-heat region by applying a constant current thereto to heat the thermistor to a temperature above that of the fluid flowing through the meter. For a given fluid velocity, the thermistor is caused by the fluid passing thereby to undergo an appreciable increase in resistance by means of the cooling effect produced by the fluid stream.

Inasmuch as the current applied to the thermistor is maintained constant, an increase in its resistance will be effective as an increase in voltage. Any increase in velocity such as that produced by a fluidic vortex will further cool the thermistor, giving rise to a further increase in voltage. The voltage variations developed in the thermistor circuit as a result of the cyclic variations in local fluid velocity, have a frequency depending on flow rate and constitute the output signal.

In the bluff-body type of vortex meter, such as that described in U.S. Pat. Nos. 3,116,639 and 3,587,312, the body is mounted within the flow conduit transversely with respect to the flow axis thereof to create fluidic oscillations whose frequency is proportional to flow rate. In U.S. Pat. No. 3,587,312, these fluidic oscillations are detected by a pair of heated thermistors operating in a manner similar to that disclosed above in connection with the Swirlmeter.

Existing thermistor sensors for vortex-type meters have several disadvantages, among which are fragility, poor frequency response and relatively large power requirements, as well as high cost and limited commercial availability.

In the prior Herzl patent No. 4,015,472, there is disclosed a vortex-type flowmeter in which a piezo-electric sensor is actuated by vortex-pressure pulses to produce an alternating voltage at a frequency corresponding to the pulse frequency. This alternating voltage is processed to produce a corresponding square-wave signal which acts, by way of an electronic switch, to control the charge/discharge action of a set of capacitors. This circuit is so arranged that the average D-C switch current is directly proportional to the frequency of the square-wave signal and this, in turn, is directly proportional to the frequency of the sensed vortices.

The average D-C switch current is filtered and then applied to a summing terminal at the input of an operational amplifier whose output is connected through a feedback resistor to a two-wire transmission line leading to a remote receiving station containing a D-C power supply and a current-sensing element connected in series with each other and with the transmission line to produce a varying output current in a useful range (4 to 20 mAdC) which is an index to the flow rate.

A similar piezo-electric sensor arrangement is disclosed in the Richardson, et al U.S. Pat. No. 3,948,098 in which the piezo-electric signal controls the charge/discharge characteristics of a set of capacitors to produce an average charging current that reflects the frequency of vortex shedding and controls an output amplifier in a feedback arrangement to produce a D-C flow signal over a two-wire transmission line leading to a remote station.

In the Richardson, et al patent whose disclosure is incorporated herein by reference, the opposing electrodes of the piezo-electric sensing element are connected through respective input resistors to the input terminals of an operational amplifier. Since piezo-electric sensors suitable for this arrangement are limited by practical considerations to very small sizes, the capacitance of such sensors is quite low - in the general order of a few picofarads (pf). This dictates a very high input impedance for the associated operational amplifier and the input resistors must therefore be of very large value (in the megohm range).

The input impedance of the operational amplifier must be equal to the capacitive reactance $X_c$ of the piezo-electric element at its minimum operating frequency. Hence, if the piezo-electric sensor has a capacitance of 7500 pF and its minimum operating frequency is 10 Hz, then the ohmic value of $X_c$ is as follows:

$$X_c = \frac{1}{2\pi fC} = \frac{1}{2 \times \pi \times 10 \times 0.0000000075} = 2,123,000 \text{ ohms}$$

As a consequence, the input resistors must have values in excess of one megohm each. Inasmuch as the signal output level is quite low, effective transmission of this signal becomes very difficult, for noise pick-up and stray leakage due to moisture are then hard to avoid. With still lower operating frequencies or values of crystal capacitance, the impedance rises correspondingly to further aggravate this problem.

The Richardson, et al patent recognizes this problem and seeks to reduce stray capacitive coupling by placing an electrostatic shield around the piezo-electric element. However, in many applications, it is desireable that the system be free of temperature-sensitive and moisture-sensitive components. Also, with a sensor system of the type disclosed in this prior patent, the sensor is not effective at extremely low meter operating frequencies such as those occurring in very large vortex meters.

SUMMARY OF INVENTION

In view of the foregoing, it is the main object of this invention to provide a noise-rejecting sensing system for a vortex-type meter which functions effectively within a very broad meter operating frequency range, the system being responsive to extremely low as well as to high frequencies.

More particularly, it is an object of this invention to provide a piezo-electric sensing system for a vortex meter in which the crystal is included as the frequency-determining element of a crystal-controlled oscillator and affords a much lower apparent impedance than a direct crystal sensing system. Because of this greatly reduced apparent impedance, a much smaller amount of noise pick-up is experienced and the system is relatively free of troublesome noise components.

Yet another object of this invention is to provide a low-power sensing system suitable for use with a two-wire signal transmitter for a vortex-type flowmeter, which system is reliable and efficient in operation and yet is of relatively low cost.

Briefly stated, in a sensing system for a vortex flowmeter in accordance with the invention, the sensor which is responsive to periodic pressure pulses derived from fluidic oscillations generated in the meter, takes the form of a resonator element such as a piezo-electric crystal which is included in the circuit of a relatively high frequency oscillator whose carrier frequency is determined by the normal resonance characteristics of the element in the absence of applied pressure pulses.

The pressure pulses applied to the sensing element act to impose both a frequency and an amplitude modulation component on the oscillator carrier signal, each component depending on the repetition rate of the pulses as a function of flow rate. One of these modulation components is demodulated independently of the other to produce an output signal whose frequency is proportional to flow rate.

OUTLINE OF THE DRAWINGS

For a better understanding of the invention as well as other objects and further features thereof, reference is made to the following detailed description to be read in conjunction with the accompanying drawings, wherein.

DESCRIPTION OF INVENTION

First Embodiment

While the sensing system in accordance with the invention is applicable to any existing form of vortex-type flowmeter in which fluidic oscillations are generated that are used to produce a signal representing the flow rate, the sensing system, by way of illustration, will be described in connection with a vortex flowmeter of the type disclosed in the prior Herzl U.S. Pat. No. 3,946,608.

Figure 1:
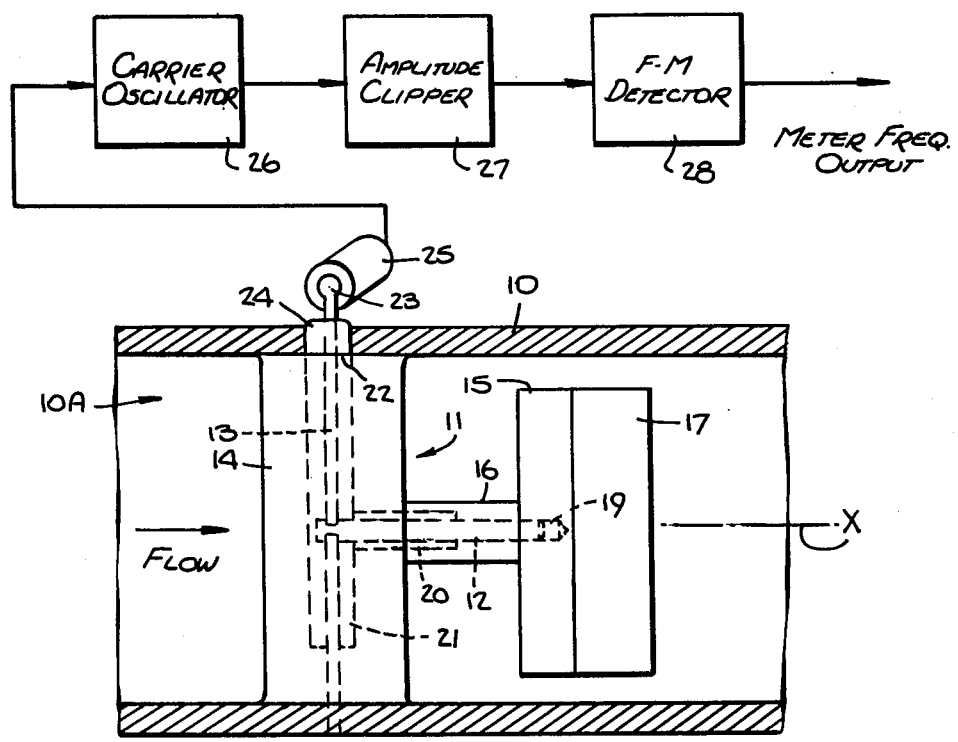
FIG. 1 illustrates a vortex-type flowmeter which operates in conjunction with one preferred embodiment of a sensing system in accordance with the invention.

In this vortex type flowmeter, as shown in FIG. 1, the fluid to be metered is conducted through a flow tube 10 interposed in a fluid line. For this purpose, flow tube 10 may be provided with mounting flanges to facilitate coupling to the end flanges of the upstream and downstream line pipes.

Mounted within flow tube 10 is an obstacle assembly generally designated by numeral 11, the assembly including a deflectable section which is responsive to the Karman Vortex street and is caused to vibrate microscopically at a frequency which is proportional to flow rate. Incorporated in the obstacle assembly is a vibration transmitter composed of a rod 12 and a probe 13.

Flow tube 10 which shown as having a circular cross section but which may in other cross-sectional forms include an inlet 10A into which the fluid to be metered is introduced. The flow impinges on obstacle assembly 11 which acts to divide the flow around the obstacle, producing fluidic perturbations in the form of a Karman Vortex. The nature of this phenomenon is explained in the text by Schlictling "Boundary Layer Theory" (McGraw-Hill 1960).

Obstacle assembly 11 is constituted by a transversely-mounted front section 14 and a rear section 15 mounted behind the front section by a cantilever support in the form of a flexible web 16. Extending downstream from rear section 16 is a tail 17. Front section 14 is a contoured block having a triangular or delta-shaped cross-section which is uniform throughout the long axis of the block, this axis being perpendicular to the flow axis X of the flow tube. The extremities of the front section are secured to the wall of the tube whereby the front section is held fixedly within the tube. The apex of block 14 faces the incoming fluid, the inclined sides thereof forming leading edges which are swept by the fluid flow to create vortices.

Rear section 15 takes the form of a non-streamlined body having a rectangular cross-section which is maintained by web 16 in spaced relation to the front section, the plane of the rear section being parallel to the flat base of the front section. The rear section shape is such as to interfere with the vortex street, and the gap 18 established between the front section block and the rear section tends to trap the vortices and to strengthen and stabilize the vortex street produced thereby.

Because rear section 15 is cantilevered by means of flexible web 16, it is deflectable. The web, though bendable, has sufficient rigidity so as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. This vibratory motion is enhanced by rail 17. The downstream section of the assembly carries out two functions, for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic oscillation, so that metal fatigue of the supporting web, as a result of the vibrating action is minimized and failures do not rise after prolonged operation.

The minute vibrations of the deflectable rear section of the obstacle assembly are sensed outside of flow tube 10. For this purpose, the vibrations are transmitted by rod 12 whose rear portion is socketed within a bore 19 which extends in a path coincident with flow tube axis X from a point about midway in web 16 to a point at the junction of rear section 15 and tail 17. The front portion of rod 12 lies freely within a relatively large diameter bore 20 communicating with the smaller diameter bore 19 and extending well into front section 14.

The vibrating motion of the rod is transferred to the exterior of the flow tube by probe 13 which is formed of spring material, one end of the probe being anchored in the wall of the flow tube. Probe 13 extends through an internal bore 21 formed in non-deflectable front section 14 along an axis at right angles to tube axis X, the bore registering with a small opening 22 in the wall of the flow tube. The free end of probe 13 protrudes through opening 22 and terminates in a coupling head 23. Openings 22 in the flow tube is sealed by a rubber diaphragm 24. When, coupling head 23 is depressed by an external sensor 24, the vibrations of rod 12 are transferred by probe 13 to the external sensor 25.

Any sensor capable of responding to a vibratory action to produce a corresponding electrical signal may be used in conjunction with the coupling head 25 of the probe. A preferred sensor for this purpose is a quartz piezoelectric load cell, such as the "Piezotron" load cell (922 series) manufactured by Kistler Instrument company of Redmond, Wash. This is a very stiff, rugged force sensor responsive to minute incremental forces and useable in environments contaminated by dust, dirt or moisture without any adverse effect on signal transmission.

Crystal sensor 25 acts as the frequency-determining element or resonator of a high-frequency carrier oscillator 26, such as a crystal-controlled oscillator of the type now used in electronic watches and operating at a frequency above 30,000 Hz to provide a time base. A typical crystal-controlled oscillator of this type is disclosed in the Roberts U.S. Pat. 3,803,827 entitled "SOLID STATE ELECTRONIC WATCH".

When piezo-electric crystal sensor 25 is de-coupled from coupling head 24, the oscillator generates its normal output frequency, say a carrier of 40,000 Hz. But when sensor 25 is pressed against coupling head 22, it is stressed thereby at the vibratory frequency of the flowmeter vortices which are transferred thereto by the mechanical transmission system formed by elements 12 and 13.

As a consequence, the resonance frequency of the crystal is frequency-modulated (i.e. shifted on either side of the 40,000 Hz carrier frequency) by the vibratory frequency of the flowmeter to yield a frequency-modulated carrier signal from oscillator 26. Concurrently, the amplitude of the carrier signal is amplitude-modulated in accordance with the vibratory rate.

In the arrangement shown in FIG. 1, only the FM component of the oscillator output is exploited, the AM component being eliminated. This is accomplished by applying the output of oscillator 26 to an amplitude clipper 27 whose constant amplitude output is fed to a conventional FM demodulator or detector 28 which extracts the frequency-modulation component from the carrier signal to produce an output signal whose frequency corresponds to the vibratory rate of coupling head 23 and therefore represents the flowrate of the fluid passing through the meter.

The crystal-controlled oscillator sensor system affords a number of very significant advantages over the direct action piezo-electric sensor system disclosed in the Richardson, et al patent, for it makes a very low impedance possible. If for example, one were to use a piezo-electric crystal having a normal resonance frequency of 40,000 Hz, the impedance value which is equal to the capacitive reactance Xc would in this instance have a value of only 530 ohms.

$$Xc = \frac{1}{2\pi fC} = \frac{1}{2 \times \pi \times 40,000 \times 0.0000000075} = 530$$

This low impedance value is almost ideal for signal transmission and almost completely avoids the leakage problems which characterize prior arrangements. Moreover, the system is operable over a much larger meter operating frequency range, for FM works down to D-C detection levels without degradation, so that very low operating frequencies, such as those encountered in large vortex-type flowmeters can be handled without difficulty, which is not true of direct piezo-electric sensor arrangements. The present system also handles maximum operating frequencies without difficulty.

The present system affords far better noise rejection than prior arrangements, this improvement being attributable to two factors. The first factor is the FM system, per se, for the FM detector is responsive only to frequency shifts; hence pick-up noises which take the form of amplitude-modulation components are virtually eliminated by the clipping action preceding the FM detector. (In lieu of a clipper, one may employ an overdriven crystal oscillator whose output is of constant amplitude regardless of the shift in frequency). Furthermore, any noise content at frequencies outside the operating range of the oscillator are almost completely rejected by the FM detector. The second factor is the much lower apparent crystal impedance which results in a much smaller amount of noise pick-up. The noise-rejection characteristics of this system make possible signal transmission that is virtually noise-free.

Second Embodiment

Figure 2:
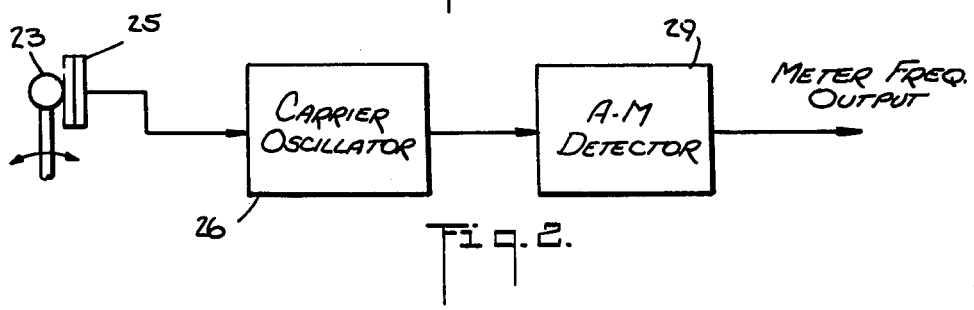
FIG. 2 illustrates in block diagram form another embodiment of the sensing system.

In the sensing arrangement illustrated in FIG. 2, the pressure-responsive crystal element 25 is included as the frequency-determining element of an oscillator 26 in exactly the same manner as in the first embodiment. However, in this instance, oscillator 26 which is both frequency and amplitude modulated, is neither clipped nor overdriven to eliminate the amplitude-modulation component resulting from the applied pressure pulses. Instead the output of oscillator 26 is applied to an amplitude-modulation detector 29 which may be a suitable diode demodulator to produce an output signal whose frequency is proportional to flow rate.

This AM sensing system is somewhat less complex than the FM arrangement shown in FIG. 1 and it possesses some but not all of the advantages thereof.

The crystal impedance is still 530 ohms, assuming a carrier frequency of 40,000 Hz. And since this is a carrier system it can carry the same broad frequency range as the FM system. While the AM system in its noise rejection characteristics is superior to that disclosed in the above-noted Richardson, et al patent, it is distinctly inferior to that of the FM system shown in FIG. 1. Hence the main justification for the AM system lies in its somewhat lower cost.

Third Embodiment

In the first and second embodiments, the pressure pulse sensor is a piezo-electric crystal element which forms the resonator of a carrier oscillator. It is not essential, however, that the resonator be a crystal, for other types of pressure-responsive resonators may be used. Thus as shown in FIG. 3, the resonator takes the form of an inductive element 30 constituted by a pot-type core having a winding thereon which is included as the resonant element of carrier oscillator 26 and determines the normal operating frequency thereof.

Core 30 is associated with a ferromagnetic armature 31 which is caused to vibrate in accordance with the fluidic oscillations generated in the vortex-type meter. Thus, instead of a coupling head 23 as in FIG. 1, probe 13 is terminated in an armature or sensor link which is caused to vibrate back and forth with respect to the core of inductor 30 to change the air gap of the magnetic circuit thereof and to carry the winding inductance accordingly, thereby causing the carrier to be both frequency and amplitude-modulated.

If the link between the sensor and the inductor is made of aluminum or a similar non-ferromagnetic conductor, the losses in the inductor will change as a function of the vibratory rate. A magnetic link is preferred for an FM system, while a conductive link may have advantages for an AM system.

Figure 3:
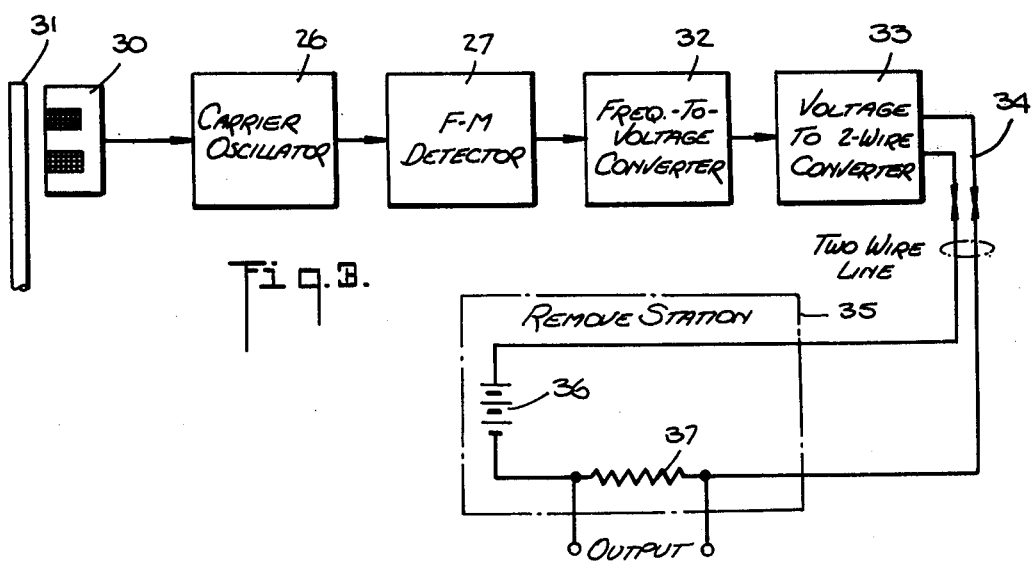
FIG. 3 is a block diagram of a third embodiment of the sensing system.

FIG. 3 shows an FM system of the FIG. 1 type in which the overdriven or clipped oscillator output is applied to FM detector 27. In practice this detector may be a low-power integrated circuit unit such as the RCA 4046 FM detector. The resultant signal, whose frequency is proportional to flow rate, is converted by a standard frequency-to-voltage converter 32 into an analog voltage. This voltage is applied to a suitable voltage-to-two wire converter 33 which may be an integrated circuit such as the National Semiconductor LH OOH5 unit.

Converter unit 33 is coupled by a two-wire line 34 to a remote station 35 having a D-C supply 36 connected in series with an output load resistor 37 to produce a current thereacross which varies in accordance with the analog voltage, applied to the converter, preferably in the useful 4 to 20 mAdC range.

The inductive sensor system has the same advantages as the piezo-electric sensor system, although the associated oscillator is not as stable, plus some advantages in reliability, cost structure and in temperature range. However, the invention is not limited to inductive frequency-determining elements and in practice the pressure-responsive sensor may be a capacitative or any other element that can be included in an oscillator to determine its operating frequency.

While there have been shown and described preferred embodiments of a two-wire transmission system for vortex-type flowmeters in accordance with the invention, it will be appreciated that many changes and modifications may be made therein without however departing from the essential spirit thereof. Thus the F-M sensing system may be used to sense changes in position rather than pressure fluctuations. Thus while the invention has been described in connection with vortex-type flowmeters, the same sensing system may be used in conjunction with other types of flowmeters such as turbine meters and Vertarators in which a change in flow rate is translated into a change in a reactive value in a sensor incorporated in an oscillator.

I claim:

1. A transmission system for a vortex-type flowmeter adapted to measure the flow rate of a fluid passing therethrough by generating fluidic pulses whose frequency varies within a low-frequency range and is a function of flow rate, said flowmeter including a deflectable element that is caused to vibrate in accordance with fluidic pulses, said system comprising:
    A. A sensor constituted by a variable reactance element included in the frequency-determining circuit of a carrier oscillator generating a relatively high-frequency carrier;
    B. means operatively coupling said deflectable element to said sensor to vary the reactance thereof in accordance with said vibrations to thereby frequency-modulate said carrier in accordance with said fluidic pulses to produce a frequency-modulated carrier;
    C. means to demodulate the frequency-modulated carrier to produce a low-frequency output signal whose frequency varies as a function of the flow rate;
    D. means to convert said output signal into an analog voltage, said means being constituted by an analog-to-two-wire line converter; and
    E. means to convey said analog voltage over a two-wire transmission line to a remote station to indicate said flow rate at a point remote from the flowmeter.

2. A system as set forth in claim 1, wherein said reactance element is a piezoelectric crystal.

3. A system as set forth in claim 1, wherein said reactance element is a variable inductor.

4. A system as set forth in claim 1, wherein said carrier is concurrently amplitude-modulated by said reactance element to produce both a frequency and an amplitude-modulation component, and further including means to suppress said amplitude-modulation component.

5. A system as set forth in claim 1, wherein said remote station includes a resistor in series with a direct-voltage source, the resistor serving to convert said analog voltage to a signal current and the source serving to supply operating power over said line to said carrier oscillator.

* * * * *

UNITED STATES PATENT OFFICE
CERTIFICATE OF CORRECTION

Patent No. 4,134,297  Dated January 16, 1979

Inventor(s) Peter J. Herzl

It is certified that error appears in the above-identified patent and that said Letters Patent are hereby corrected as shown below:

Column 4, line 1 "used" should have read -- sensed --

Column 4, line 19 before "shown" the word -- is -- should have been inserted

Column 4, line 33 "16" should have read -- 15 --

Column 5, line 26 "ings" should have read -- ing --

Column 5, line 5 "rise should have read -- arise --

Column 7, line 33 after "have" the word -- some-- should have appeared.

Signed and Sealed this

Twenty-ninth Day of May 1979

[SEAL]

Attest:

RUTH C. MASON
Attesting Officer

DONALD W. BANNER
Commissioner of Patents and Trademarks